United States Patent [19]

Hunt

[11] Patent Number: 5,026,223

[45] Date of Patent: Jun. 25, 1991

[54] BAYONET TOOL LOCKING DEVICE

[75] Inventor: Carl E. Hunt, White Lake, Mich.

[73] Assignee: GTE Valenite Corporation, Troy, Mich.

[21] Appl. No.: 630,589

[22] Filed: Dec. 20, 1990

[51] Int. Cl.⁵ .................................................. B23C 5/26
[52] U.S. Cl. .................................... 409/233; 408/239 A
[58] Field of Search ............... 409/231, 232, 233, 234;
279/89, 94; 408/239, 239 A, 240

[56] References Cited

U.S. PATENT DOCUMENTS

| | | | |
|---|---|---|---|
| 2,441,046 | 5/1948 | Turrettini | 409/233 |
| 3,118,345 | 1/1964 | Bullard, III et al. | 409/233 |
| 3,842,712 | 10/1974 | Bondie et al. | 409/233 |
| 4,199,286 | 4/1980 | Kirkham | 409/239 A X |
| 4,906,147 | 3/1990 | Friesinger et al. | 409/232 |

FOREIGN PATENT DOCUMENTS 0405666  8/1974  U.S.S.R. ............................. 409/233

Primary Examiner—Z. R. Bilinsky
Attorney, Agent, or Firm—Bill C. Panagos

[57] ABSTRACT

A device for locking a tool to a cutting machine. During a locking action a drawbar is rotated to bring a radial lock pin into registry with oppositely directed bayonet slots formed in a tool that has been inserted into a pocket in the end face of a tool holder; a spring acts on the drawbar to move the lock pin into the bayonet slots. The lock pin is carried on a nose element that is threaded onto the drawbar for drawing the lock pin toward the drawbar to achieve an axial lock force between the tool and the tool holder. Tapered frusto-conical surfaces on the tool and holder produce a self-centering tapered sticking lock action. The oppositely directed bayonet slots allow the tool to be forceably dislodged from the sticking taper when the drawbar is rotated in a reverse direction.

11 Claims, 1 Drawing Sheet

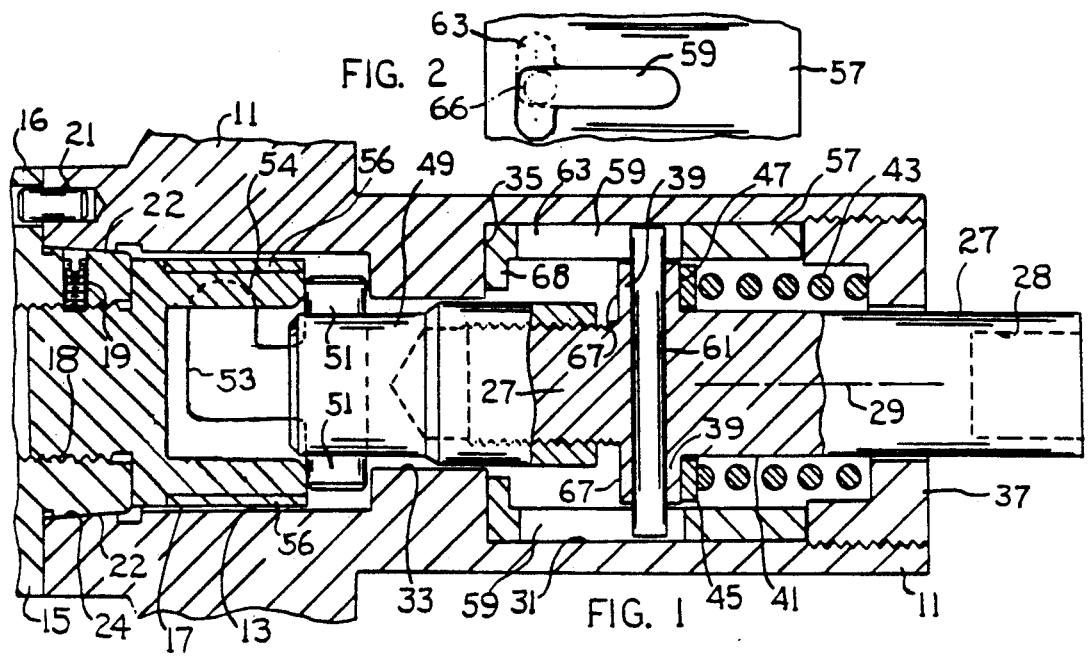
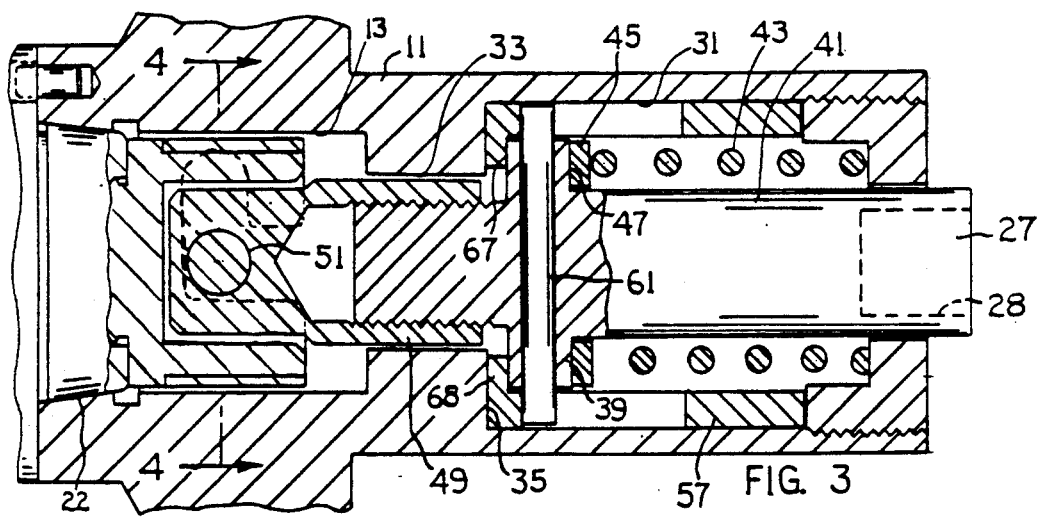
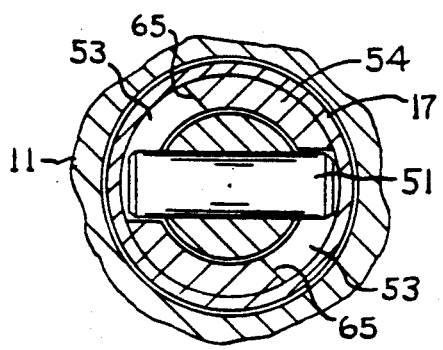

5,026,223

BAYONET TOOL LOCKING DEVICE

BACKGROUND AND SUMMARY

This invention relates to a device for locking a cutting tool machine. The locking device is similar in some respects to locking devices shown in U.S. Pat. No. 3,118,345 to Bullard et al, U.S. Pat. No. 3,311,024 to J. Daugherty, U.S. Pat. No. 3,730,637 to V. Cellini, U.S. Pat. No. 4,758,122 to H. Kubo, and U.S. Pat. No. 4,906,147 to Friesinger et al.

The locking device of the present invention is designed to achieve a secure locking of the tool to the cutting machine, with a relatively strong axial holding force; a screw thread frictional force augments the axial lock force. The tool is received within an axially-extending pocket in the exposed face of a holder that forms part of the machine; a bayonet lock system is combined with a threaded puller (clamping) mechanism to securely retain the tool against axial dislocation out of the pocket. Radial and circumferential loads are transmitted from the tool directly to the holder. Axial loads are transmitted from the tool through the threaded clamping mechanism to the holder; the clamping mechanism is required to handle only the axial loads.

During the process of locking the tool to the holder a drawbar is rotated to cause a lock pin to enter into a bayonet slot means carried by the tool. Rotation of the drawbar moves the pin into the blind end of the bayonet slot, after which a nose piece has a screw motion along the drawbar to pull the lock pin axially so as to produce an axial clamp action between the tool and holder. The tool has a tapered shank that wedges into the holder to provide a very secure connection between the tool and holder. To unlock the tool from the holder the drawbar is rotated in a reverse direction so that the nose piece has a reverse screw travel along the drawbar; the lock pin exerts an axial force on the tool to unseat it from the holder.

THE DRAWINGS

FIG. 1 is a fragmentary longitudinal sectional view taken through a tool locking device embodying this invention.

FIG. 2 is a fragmentary view of a structural detail employed in the FIG. 1 locking device.

FIG. 3 is a sectional view taken in the same direction as FIG. 1, but showing the locking device in a different condition of adjustment.

FIG. 4 is a fragmentary sectional view taken on line 4—4 in FIG. 3.

DESCRIPTION OF A PREFERRED EMBODIMENT OF THE INVENTION

The drawings show a holder 11 of a conventional cutting machine. In the illustrated arrangement the cutting machine is a turret lathe; holder 11 is a stationary non-rotating part of the machine. At its left end holder 11 is formed with a pocket 13 that is adapted to receive a tool assembly 15.

The illustrated tool assembly 15 comprises a tool body 16 and tool connector 17. The connector is threaded into the tool body at 18, after which a set screw 19 is installed to rigidly hold the tool assembly together. For present purposes, tool body 16 and tool connector 17 constitute a single tool that can be moved between a locked position securely mounted in (on) holder 11, and an unlocked position separated from holder 11. The primary object of the present invention is to provide a tool locking mechanism that can be expeditiously operated to securely lock the tool to holder 11 or unlock the tool from holder 11.

Projecting from the end face of holder 11 is a locator pin 21. Tool body 16 has a mating hole in its end face adapted to fit onto pin 21 to prevent the tool from rotating relative to holder 11 during the locking or unlocking process. The primary locking force is provided by a tapered shank surface 22 on tool body 16 and a mating tapered bore surface 24 formed at the mouth of pocket 13 in holder 11. Tapered surfaces 22 and 24 are frusto-conical surfaces having similar taper angles of about three degrees. When tool assembly 15 is pulled axially into holder 11 the tapered surfaces lock together in a wedged condition, thereby providing a secure locking of the tool assembly in the holder.

A rotary drawbar 27 extends within holder 11 for independent rotation around holder axis 29 when the locking device is in the process of locking the tool to holder 11 or unlocking the tool from holder 11; rotation of the drawbar in one direction effects a tool lock action, and rotation of the drawbar in the opposite direction produces a tool unlock action.

A hexagonal socket 28 in the right end face of the drawbar is adapted to receive a hexagonal turning implement (allen wrench) for achieving a rotary motion of the drawbar.

As shown in FIG. 1, the drawbar extends leftwardly through a large diameter axial bore 31 in holder 11 into a reduced diameter connecting bore 33 formed between bore 31 and aforementioned pocket 13. The juncture between bores 31 and 33 forms an annular radial shoulder 35. The drawbar is floatably mounted within holder 11 so that the drawbar can rotate within holder 11 and also move axially toward or away from pocket 13.

The drawbar is formed with a large diameter section 39 and a small diameter section 41. A coil spring 43 encircles section 41 of the drawbar between retainer nut 37 and a washer 45 carried on the drawbar so as to exert a leftward biasing force on drawbar section 39. Washer 45 is rotatably seated against radial surface 47 of the drawbar so that the drawbar can rotate without transmitting a significant rotational distortional force to the spring; during rotational movement of the drawbar radial surface 47 has rotary slidable motion on washer 45.

At its left end the drawbar is threaded to mate with internal threads formed on a nose element 49. A radial lock pin 51 extends transversely through the nose element to mate with bayonet slots 53 formed in an annular section 54 of tool connector portion 17. A sleeve 56 is press fit onto annular section 54.

As shown in FIG. 1, lock pin 51 extends in the plane of the paper transverse to the bayonet slots 53. FIG. 3 shows lock pin 51 extending within the bayonet slots. Rotation of the drawbar provides the impetus for moving the lock pin to a position in registry with the bayonet slots. As the drawbar rotates to a position where lock pin 51 is transverse to the plane of the paper, spring 43 moves the drawbar and attached nose element 49 leftwardly to force pin 51 into the FIG. 3 position within the bayonet slots.

A sleeve 57 is rotatably (swivably) mounted within holder 11 in surrounding relation to drawbar 27. Two axial slot sections 59 are formed in the sleeve to accommodate the ends of a radial connector pin 61 extending through the drawbar. A circumferential slot section 63 is connected to each axial slot section 59 so that when the drawbar is in the FIG. 3 position connector pin 61 moves to a position at the left ends of slot sections 59, as indicated by numeral 66 in FIG. 2. Each axial slot section 59 and connected circumferential slot section 63 forms an L-shaped slot. FIG. 2 shows one of the L-shaped slots in full lines. The other L-shaped slot is shown partially, using dotted lines. The two L-shaped slots are similar except that the circumferential slot sections extend in opposite directions, whereby when pin 61 is in the FIG. 3 position it can rotate around drawbar axis 29 so that its ends move freely within circumferential slot sections 63 for a limited rotational distance. When the drawbar is in the FIG. 1 position connector pin 61 extends into axial slot sections 59, such that sleeve 57 and drawbar 27 are rotatable as a unit. Sleeve 57 has an inwardly-radiating flange 65 in axial registry with aforementioned shoulder 35 and drawbar radial surface 67.

FIG. 1 represents the unlocked condition of the device, with tool assembly 15 inserted loosely into pocket 13 to compress spring 43. To achieve a locking action drawbar 27 is rotated so that lock pin 51 registers with the bayonet slots 53. Spring 43 then moves the drawbar and nose element 49 leftwardly so that pin 51 moves into the bayonet slots (as shown in FIG. 3). Continued rotation of the drawbar enables pin 51 to move into the blind ends 65 of the bayonet slots; at this time connector pin 61 is in the position designated by numeral 66 (FIG. 2). When lock pin 51 reaches the blind ends of the bayonet slots nose element 49 stops rotating (because pin 21 prevents rotation of the tool assembly). However drawbar 27 continues to rotate, such that nose element 49 shifts slightly to the right because of its threaded connection with the drawbar. The thread action produces a pressure engagement between tapered shank surface 22 of the tool and tapered bore surface 24 on holder 11. At the same time the thread action causes drawbar 27 to be drawn slightly to the left so that sleeve flange 68 is squeezed between shoulder 35 and drawbar radial surface 67. This squeezing action brings the drawbar gradually to a stopped position.

Sleeve 57 and its radial flange 68 have pressure contact with surface 35 to bring the assembly to a tool-clamped condition in which the tool has axial pressure engagement with tapered surface 24; the tapered surfaces act to center the tool relative to holder 11.

To effect an unlocking action the drawbar is rotated in the reverse direction. Initially, connector pin 61 moves into circumferential slot sections 63 from axial slot sections 59; at the same time nose element 49 may experience a slight leftward unthreading action on the drawbar threads to reduce the squeeze pressure of surfaces 35 and 67 on sleeve flange 68. Slot sections 63 enable the drawbar to be turned a slight distance without having to rotate nose element 49; as the squeeze pressure on sleeve flange 68 is reduced nose element 49 is rotated so that pin 51 moves from the circumferential portions of bayonet slots 53 into the axial portions of the bayonet slots (as depicted in FIG. 4). Tool assembly 16 cannot rotate (because of the action of pin 21); reverse rotation of drawbar 27 therefore causes nose element 49 to partially unthread from the drawbar. The nose element shifts leftwardly (in FIG. 3) to cause pin 51 to push the tool away from holder 11. The unthreading motion of nose element 49 along drawbar 27 acts as a positive force to cause tapered surfaces 22 and 24 to be disengaged from each other.

The threaded connection between nose element 49 and drawbar 27 provides a mechanical advantage, whereby a relatively small wrench force (applied to socket 28) can produce a relatively strong locking/unlocking force between tapered surfaces 22 and 24.

The drawings shows the bayonet slots on tool assembly 15, and lock pin 51 on nose element 49. However, the reverse arrangement could be used, i.e. the lock pin could be formed on the tool assembly and the bayonet slots could be formed on the nose element. Some structural redesign would be required.

I claim:

1. In a cutting machine: the improvement comprising a tool holder having a tool-reception pocket; a tool insertable into the pocket; a rotary drawbar extending within the holder; spring means biasing the drawbar axially toward the pocket; a nose element having a threaded connection on the drawbar in the space between the spring means and the pocket; one of said nose element and said tool having a radial lock pin thereon; the other of said nose element and said tool having a bayonet slot thereon, whereby the biasing action of the spring means causes the lock pin to be located in the bayonet slot; the thread action between the nose element and the drawbar being such that when the lock pin is within the bayonet slot the drawbar and nose element can rotate together until the lock pin is engaged with the blind end of the bayonet slot, after which the nose element ceases to rotate while the drawbar continues to rotate so that the thread action between the nose element and drawbar produces an axial pressure engagement between the tool and the holder.

2. In a cutting machine; the improvement comprising a tool holder having a tool-reception pocket that includes a pocket mouth surface; a tool insertable through said mouth surface into said pocket; a rotary drawbar extending within the holder; spring means biasing said drawbar axially toward the pocket; a nose element having a threaded connection on the drawbar in the space between the spring means and the pocket; said nose element having a radial lock pin, and said tool holder having oppositely directed bayonet slots whereby the biasing action of the spring means enables the lock pin to move into the bayonet slots; the thread action between the nose element and the drawbar being such that when the lock pin is within the bayonet slots the drawbar and nose element can rotate together in one direction until the lock pin reaches the blind ends of the bayonet slots, after which the nose element ceases to rotate while the drawbar continues to rotate so that the thread action between the nose element and drawbar produces an axial pressure engagement between the tool and the pocket mouth surface; said drawbar being rotatable in the opposite direction so as to move the nose element toward the tool whereby the lock pin urges the tool out of engagement with the pocket mouth surface.

3. The improvement of claim 2, and further comprising a sleeve means arranged between the drawbar and tool holder to facilitate a rotary unlocking motion of the drawbar.

4. The improvement of claim 3, wherein said sleeve means comprises a rotary sleeve located within the holder in surrounding relation to the drawbar; said sleeve having a circumferential slot, and said drawbar having a radial connector element extending into said circumferential slot.

5. The improvement of claim 3, wherein said sleeve means comprises a rotary sleeve located within the holder in surrounding relation to the drawbar; said sleeve having an axial slot and a circumferential slot extending from said axial lot; said sleeve having an inwardly-radiating flange, said drawbar and holder having radial shoulders axially aligned with said inwardly-radiating flange; said drawbar having a radial connector element extending into said axial slot so that the sleeve can rotate with the drawbar until the thread action between the nose element and drawbar produces an axial squeezing action of the radial shoulders on the sleeve flange.

6. The improvement of claim 5 wherein said radial connector element is a circular pin.

7. The improvement of claim 5, wherein said drawbar has a large diameter section and a small diameter section; said spring means being an axially-extending coil spring encircling the small diameter section of the drawbar.

8. The improvement of claim 7, wherein said large diameter section of the drawbar defines two oppositely-facing radial surfaces, one of which is axially aligned with the sleeve flange for exerting a squeezing force thereon.

9. The improvement of claim 8, and further comprising an annular spring seat element rotatably engaged against the other radial surface on the drawbar so that the drawbar can rotate without transmitting a rotational force to the coil spring.

10. The improvement of claim 8, wherein the mouth surface of said pocket has a frusto-conical configuration, and said tool has a tapered shank adapted to mate with said mouth surface in a self-centering locked condition.

11. In a cutting machine: the improvement comprising a tool holder having an exposed face, a pocket inset into said exposed face to define a tapered mouth surface; a large diameter axial bore in said holder spaced axially from said pocket to define a radial shoulder; a reduced diameter connector bore extending through the holder between the pocket and the radial shoulder; a tool insertable axially into said pocket, said tool holder having a tapered shank adapted to abut against said tapered mouth surface; a rotary drawbar extending through the axial bore into the connector bore; spring means biasing said drawbar toward the pocket; a nose element having a threaded connection on the drawbar for floating disposition with the connector bore; said nose element having a radial lock pin, and said tool having oppositely directed bayonet slots whereby the biasing action of the spring means enables the lock pin to move into the bayonet slots; a rotary sleeve within said axial bore in surrounding relation to said drawbar, said sleeve having an axial slot and a circumferential slot extending from the axial slot; said sleeve having a radial flange in near proximity to said radial shoulder; said drawbar having a radial connector element extending into said axial slot so that the sleeve can rotate with the drawbar; said nose element being threaded onto the drawbar so that when the lock pin is within the bayonet slots the drawbar and nose element can rotate together until the lock pin reaches the blind ends of the bayonet slots, after which the nose element ceases to rotate while the drawbar continues to rotate, whereby the thread action between the nose element and drawbar moves the lock pin axially to produce pressure engagement between the tapered shank and the tapered mouth surface; said drawbar being rotatable so that said radial connector element moves into the associated circumferential slot, whereby the thread action between the nose element and drawbar causes the sleeve flange to be squeezed between the radial shoulder and the drawbar.

* * * * *

UNITED STATES PATENT AND TRADEMARK OFFICE
CERTIFICATE OF CORRECTION

PATENT NO. : 5,026,223
DATED : June 25, 1991
INVENTOR(S) : Carl E. Hunt

It is certified that error appears in the above-identified patent and that said Letters Patent is hereby corrected as shown below:

Column 2, line 6, after "holder" -- "IL" should be replaces with "11".

Signed and Sealed this

Third Day of November, 1992

Attest:

DOUGLAS B. COMER

Attesting Officer

Acting Commissioner of Patents and Trademarks